US011990785B2

(12) United States Patent
Seki (10) Patent No.: US 11,990,785 B2
(45) Date of Patent: May 21, 2024

(54) BATTERY CONTROL DEVICE (71) Applicant: Hitachi Astemo, Ltd., Hitachinaka (JP)

(72) Inventor: Kotaro Seki, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 291 days.

(21) Appl. No.: 17/504,940

(22) Filed: Oct. 19, 2021

(65) Prior Publication Data
US 2022/0123577 A1 Apr. 21, 2022

(30) Foreign Application Priority Data
Oct. 21, 2020 (JP) ................................. 2020-176458

(51) Int. Cl.
H02J 7/00 (2006.01)

(52) U.S. Cl.
CPC .... *H02J 7/007182* (2020.01); *H02J 7/00032* (2020.01); *H02J 7/0013* (2013.01); *H02J 7/0047* (2013.01)

(58) Field of Classification Search
CPC .................................................. H02J 7/0013
See application file for complete search history.

(56) References Cited

U.S. PATENT DOCUMENTS

| 7,782,014 B2* | 8/2010 | Sivertsen | H02J 7/0016 320/152 |
| 2008/0204172 A1* | 8/2008 | Sakai | H04B 3/30 333/22 R |
| 2013/0187610 A1* | 7/2013 | Hayashi | H02J 7/00 320/118 |
| 2015/0028879 A1* | 1/2015 | Butzmann | G01R 31/3842 324/427 |
| 2015/0207342 A1* | 7/2015 | Miyajima | H02J 7/0047 320/116 |
| 2018/0313902 A1* | 11/2018 | Nagasue | H02J 7/0047 |
| 2019/0116480 A1* | 4/2019 | Schultz | H04W 52/0229 |

(Continued)

FOREIGN PATENT DOCUMENTS

JP 2015136255 A 7/2015

OTHER PUBLICATIONS

JPO Notification (information statement) for corresponding JP Application No. 2020-176458; dated Sep. 19, 2023.

(Continued)

*Primary Examiner* — Drew A Dunn
*Assistant Examiner* — Tynese V McDaniel
(74) *Attorney, Agent, or Firm* — CANTOR COLBURN LLP (57) ABSTRACT A battery control device includes a plurality of voltage detection circuits that are provided so as to correspond to a plurality of battery modules constituting a battery and detect voltages of the battery modules; a plurality of communication cables that connect the voltage detection circuits in a daisy chain manner through coupling capacitors; and a control circuit that transmits and receives communication signals to and from the voltage detection circuits through the communication cables and controls the battery on the basis of the voltages received from the voltage detection circuits. Communication terminals connected to the communication cables in the voltage detection circuit are grounded through a predetermined passive circuit.

2 Claims, 5 Drawing Sheets (56) References Cited

U.S. PATENT DOCUMENTS

2020/0313934 A1* 10/2020 Shuvalov ............... H04B 10/40
2021/0159710 A1* 5/2021 Furukawa ......... H02J 13/00007

OTHER PUBLICATIONS

LTC6813-1 Datasheet and Product Information, Analog Devices, [online], Analog Devices, [Search on Aug. 19, 2023], Internet <URL:https://www.analog.com/jp/products/ltc6813-1.html>; 17 pages.
LTC6813-1: Multicell Battery Monitor Data Sheet (Rev. 0), [online], Analog Devices, Feb. 12, 2018, [Search on Aug. 19, 2023], Internet <URL:https://www.analog.com/media/jp/technical-documentation/data-sheets/j68131f_jp.pdf>; 176 pages.

* cited by examiner

BATTERY CONTROL DEVICE

CROSS-REFERENCE TO RELATED APPLICATION

This present invention claims priority under 35 U.S.C. § 119 to Japanese Patent Application No. 2020-176458, filed on Oct. 21, 2020, the entire content of which is incorporated herein by reference.

BACKGROUND OF THE INVENTION

Field of the Invention

The present invention relates to a battery control device.

Description of Related Art

The following Japanese Unexamined Patent Application, First Publication No. 2015-136255 discloses a voltage detection device. The voltage detection device includes a plurality of voltage detection circuits that are provided for each battery module of a battery and detect a voltage of each battery cell; a plurality of voltage detection lines that connect the battery cells and the voltage detection circuits; and a control device that controls the charging and discharging of the battery cells on the basis of detection information obtained from the voltage detection circuits. The voltage detection circuit detects the voltage of each battery cell through the voltage detection line. The plurality of voltage detection circuits are connected in series to each other through the communication lines. The voltage detection circuit at one end of the series circuit is connected to the control device through the communication lines. A voltage detection line at the lowest potential which is connected to one of adjacent voltage detection circuits and a voltage detection line at the highest potential which is connected to the other voltage detection circuit are adjacent to each other and are connected through a first capacitor.

SUMMARY OF THE INVENTION

In the background technique, the plurality of voltage detection circuits and the control device are connected in a so-called daisy chain manner, and the voltage of each battery cell detected by each voltage detection circuit is notified to the control device through other voltage detection circuits. In the background technique, the first capacitors are inserted into the communication lines connecting the plurality of voltage detection circuits to electrically insulate each voltage detection circuit. Therefore, the influence of noise is reduced, and the stable operation of each voltage detection circuit is ensured.

In the background technique, since each voltage detection circuit is electrically insulated, there is a possibility that the potential of the communication signal transmitted through the communication line is not stable. Then, when the potential of the communication signal is not stable, there is a possibility that it is difficult to achieve accurate communication in the plurality of voltage detection circuits and the control device and thus to accurately notify the voltage of each battery cell detected by each voltage detection circuit to the control device.

The invention has been made in view of the above-mentioned circumstances, and an object of the invention is to ensure the stability of the potential of a communication signal when a plurality of voltage detection circuits are connected in a daisy chain manner through capacitors.

In a first aspect of the invention, there is provided a battery control device including: a plurality of voltage detection circuits that are provided so as to correspond to a plurality of battery modules constituting a battery and detect voltages of the battery modules; a plurality of communication cables that connect the voltage detection circuits in a daisy chain manner through coupling capacitors; and a control circuit that transmits and receives communication signals to and from the voltage detection circuits through the communication cables and controls the battery on the basis of the voltages received from the voltage detection circuits. Communication terminals connected to the communication cables in the voltage detection circuit are grounded through a predetermined passive circuit.

In a second aspect of the invention, in the battery control device according to the first aspect, the communication cable separately includes a first communication line for uplink communication and a second communication line for downlink communication, and each of a first communication terminal connected to the first communication line and a second communication terminal connected to the second communication line in the voltage detection circuit is grounded through the passive circuit.

In a third aspect of the invention, in the battery control device according to the second aspect, the passive circuit may include: a first resistor that has one end connected to the first communication terminal; a second resistor that has one end connected to the second communication terminal; and a capacitor that has one end connected to the other end of the first resistor and the other end of the second resistor and the other end grounded.

In a fourth aspect of the invention, in the battery control device according to the third aspect, a power terminal of the voltage detection circuit is connected to the other end of the first resistor through a second capacitor.

In a fifth aspect of the invention, in the battery control device according to any one of the first to third aspects, a power terminal of the voltage detection circuit is grounded through a second passive circuit.

According to the invention, it is possible to ensure the stability of the potential of a communication signal when a plurality of voltage detection circuits are connected in a daisy chain manner through capacitors.

BRIEF DESCRIPTION OF THE DRAWINGS

FIGS. 4A-FIG. 4C are diagrams showing the waveform of a communication signal of the voltage detection circuit according to the embodiment of the invention.

DETAILED DESCRIPTION OF THE INVENTION

Hereinafter, an embodiment of the invention will be described with reference to the drawings.

Figure 1:
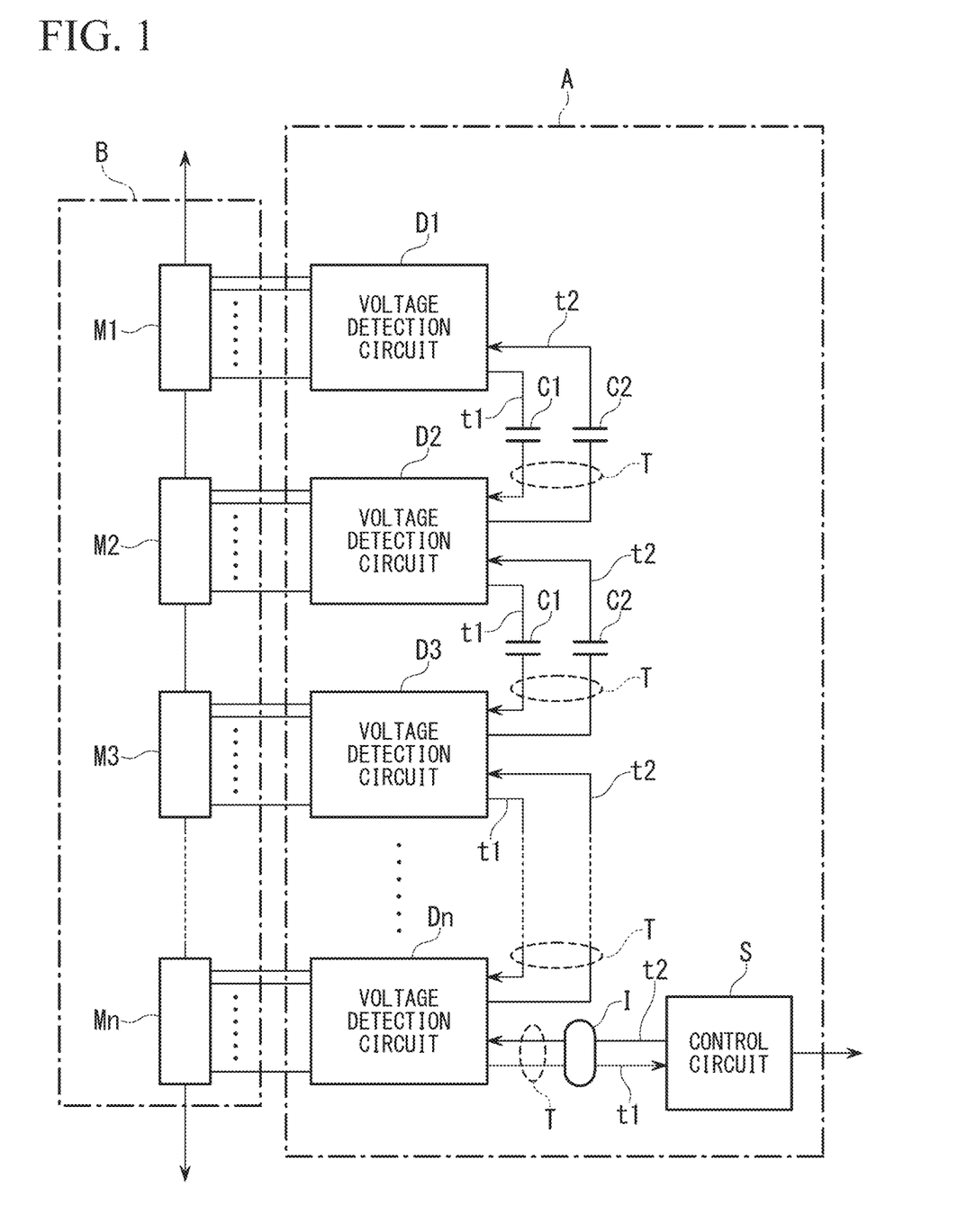
FIG. 1 is a block diagram showing the overall configuration of an in-vehicle battery control device according to an embodiment of the invention.

As shown in FIG. 1, an in-vehicle battery control device A according to this embodiment includes n voltage detection circuits D1 to Dn, communication cables T, an insulation circuit I, and a control circuit S. The in-vehicle battery control device A is mounted on a motor-driven vehicle, such as an electric vehicle or a hybrid vehicle, which has a motor as a driving power source and controls an assembled battery B such as a lithium ion battery. In addition, in this embodiment, "n" is a natural number.

The assembled battery B according to this embodiment will be described first. The assembled battery B has n battery modules M1 to Mn which are connected in series to each other and has, for example, an output voltage (battery voltage) of several hundred volts. The assembled battery B is a secondary battery that supplies acceleration power to a power control unit (PCU) that is a traveling drive circuit, which is not shown. The PCU converts the acceleration power (battery power) of the assembled battery B into motor driving power (alternating-current power).

Each of the n battery modules M1 to Mn has a plurality of battery cells which are connected in series or in parallel to each other and outputs a direct-current power of a predetermined output voltage (module voltage). The assembled battery B including the n battery modules M1 to Mn corresponds to a battery according to the invention.

The n voltage detection circuits D1 to Dn are integrated circuits which are provided so as to correspond to the n battery modules M1 to Mn. The n voltage detection circuits D1 to Dn detect and monitor the voltage (cell voltage) of each battery cell in the corresponding battery modules M1 to Mn. The cell voltage of each battery cell is a physical quantity indicating the state of the assembled battery B, that is, the n battery modules M1 to Mn.

The voltage detection circuits D1 to Dn are electronic circuits that transmit a plurality of cell voltages (battery information) in each of the battery modules M1 to Mn to the control circuit S through a plurality of communication cables T. The plurality of communication cables T are signal lines that interconnect the n voltage detection circuits D1 to Dn and the control circuit S in a daisy chain connection form such that they can communicate with each other.

That is, the plurality of communication cables T connect in a row the n voltage detection circuits D1 to Dn which are slave units to the control circuit S which is a master unit. Specifically, the plurality of communication cables T interconnect the n voltage detection circuits D1 to Dn and the control circuit S in the order of the voltage detection circuit D1 the voltage detection circuit D2 the voltage detection circuit D3 (omitted) the voltage detection circuit Dn the control circuit S.

The plurality of communication cables T include a first communication line t1 for uplink communication, a first coupling capacitor C1, a second communication line t2 for downlink communication, and a second coupling capacitor C2. In addition, among the plurality of communication cables T, the communication cable T that interconnects the n-th voltage detection circuit Dn and the control circuit S includes the insulation circuit I instead of the first coupling capacitor C1 and the second coupling capacitor C2 as shown in FIG. 1.

In the plurality of communication cables T, each first communication line t1 is an electric wire that transmits an uplink communication signal output from each of the voltage detection circuits D1 to Dn to the control circuit S. Further, in the plurality of communication cables T, each first coupling capacitor C1 is provided in the middle of each first communication line t1 and blocks the transmission of a direct-current component between the voltage detection circuits D1 to Dn.

In the plurality of communication cables T, each second communication line t2 is an electric wire that transmits a downlink communication signal output from the control circuit S to each of the voltage detection circuits D1 to Dn. Further, in the plurality of communication cables T, each second coupling capacitor C2 is provided in the middle of each second communication line t2 and blocks the transmission of the direct-current component between the voltage detection circuits D1 to Dn.

That is, the first coupling capacitor C1 and the second coupling capacitor C2 in each communication cable T are circuit elements that ensure electrical isolation in each of the voltage detection circuits D1 to Dn. Since the voltage detection circuits D1 to Dn are connected to each other in the daisy chain manner by the plurality of communication cables T including the first coupling capacitor C1 and the second coupling capacitor C2, it is possible to suppress the mutual interference between the voltage detection circuits D1 to Dn.

The insulation circuit I is provided in the communication cable T which interconnects the n-th voltage detection circuit Dn and the control circuit S among the plurality of communication cables T. The insulation circuit I is a circuit for obtaining electrical isolation like the first coupling capacitor C1 and the second coupling capacitor C2 and is, for example, a photocoupler or a pulse transformer. The insulation circuit I suppresses the electrical interference between the n battery modules M1 to Mn and the control circuit S.

The control circuit S transmits and receives communication signals to and from the n voltage detection circuits D1 to Dn through the communication cables T and controls the assembled battery B on the basis of the cell voltages of the battery modules M1 to Mn received from the n voltage detection circuits D1 to Dn. The control circuit S transmits control commands to the n voltage detection circuits D1 to Dn through the second communication lines t2 of the plurality of communication cables T and receives the voltage (cell voltage) of each battery cell from the n voltage detection circuits D1 to Dn through the first communication lines t1 of the plurality of communication cables T.

Next, the detailed configuration of the n voltage detection circuits D1 to Dn will be described. In addition, since the n voltage detection circuits D1 to Dn have substantially the same configuration, the detailed configuration of the voltage detection circuit D1 (first voltage detection circuit) will be described as a representative below.

Figure 2:
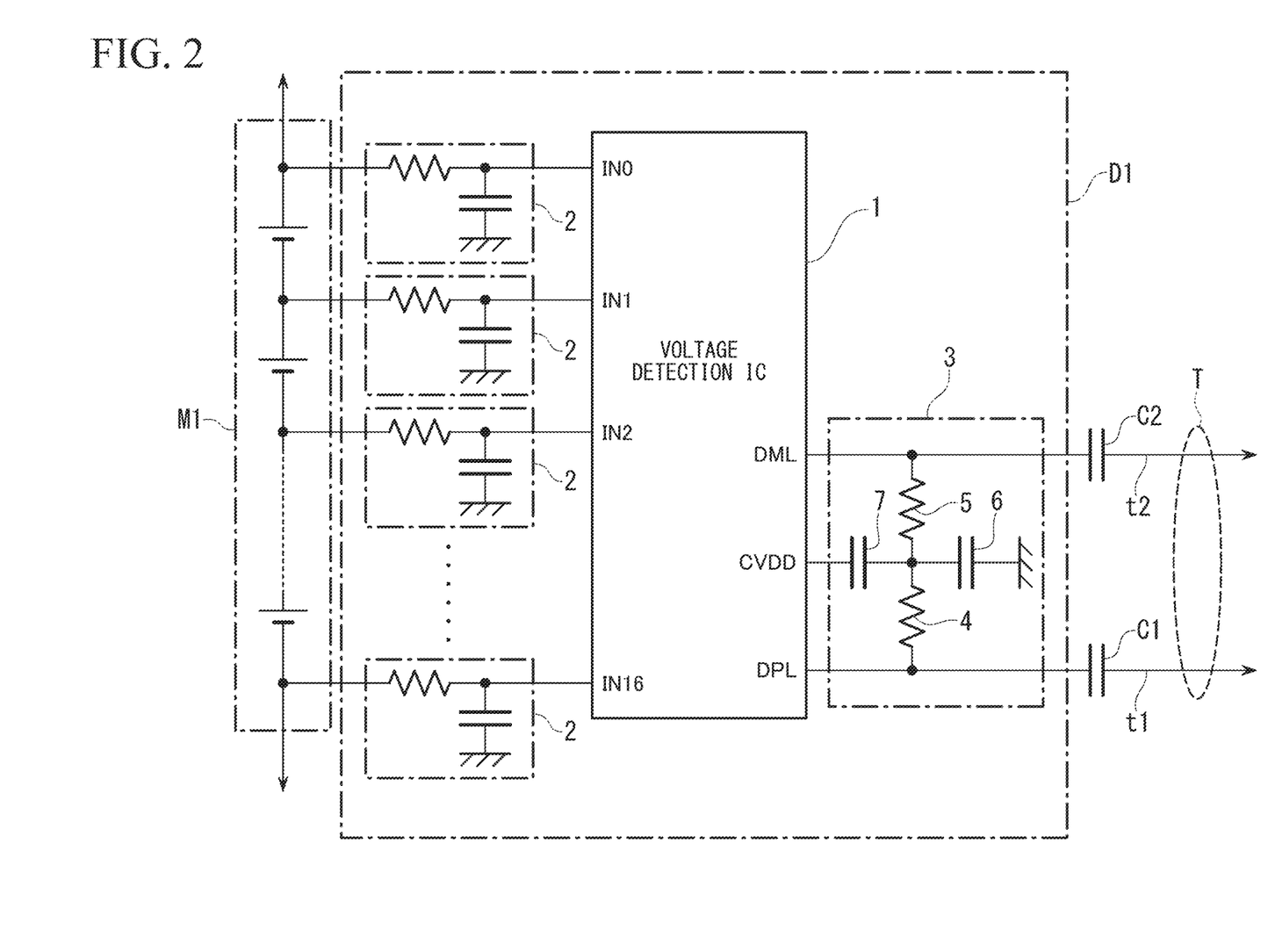
FIG. 2 is a circuit diagram showing the overall functional configuration of a voltage detection circuit according to the embodiment of the invention.

As shown in FIG. 2, the first voltage detection circuit D1 includes a voltage detection IC 1, a plurality of CR filters 2, and a communication addition circuit 3. The voltage detection IC 1 is an integrated circuit which is provided with a plurality of connection terminals as shown in FIG. 2. Among the connection terminals, terminals IN0 to IN16 are analog voltage input terminals which are connected to electrodes of the battery cells constituting the first battery module M1 through the CR filters 2.

For example, the terminal IN0 is connected to a positive electrode of a first battery cell which is located at the highest voltage among a plurality of battery cells constituting the first battery module M1 through a first CR filter 2. In addition, the terminal IN1 is connected to a negative electrode of the first battery cell, that is, a positive electrode of a second battery cell which is located at the lower voltage of the first battery cell through a second CR filter 2.

Further, the terminal IN2 is connected to a negative electrode of the second battery cell, that is, a positive electrode of a third battery cell which is located at the lower voltage of the second battery cell through a third CR filter 2. Furthermore, the terminal IN16 is connected to a negative electrode of a sixteenth battery cell which is located at the lowest voltage among the plurality of battery cells constituting the first battery module M1 through a seventeenth CR filter 2.

The voltage detection IC 1 includes at least a first communication terminal DPL, a second communication terminal DML, and a power monitor terminal CVDD in addition to the terminals IN0 to IN16. The first communication terminal DPL is an output terminal that outputs an uplink communication signal to one end of the first communication line t1. The second communication terminal DML is an input terminal to which a downlink communication signal is input through the second communication line t2.

Here, the first communication terminal DPL and the second communication terminal DML correspond to communication terminals according to the invention. Further, the first communication terminal DPL corresponds to a first communication terminal according to the invention, and the second communication terminal DML corresponds to a second communication terminal according to the invention. Furthermore, the power monitor terminal CVDD corresponds to a power terminal according to the invention.

Figure 3:
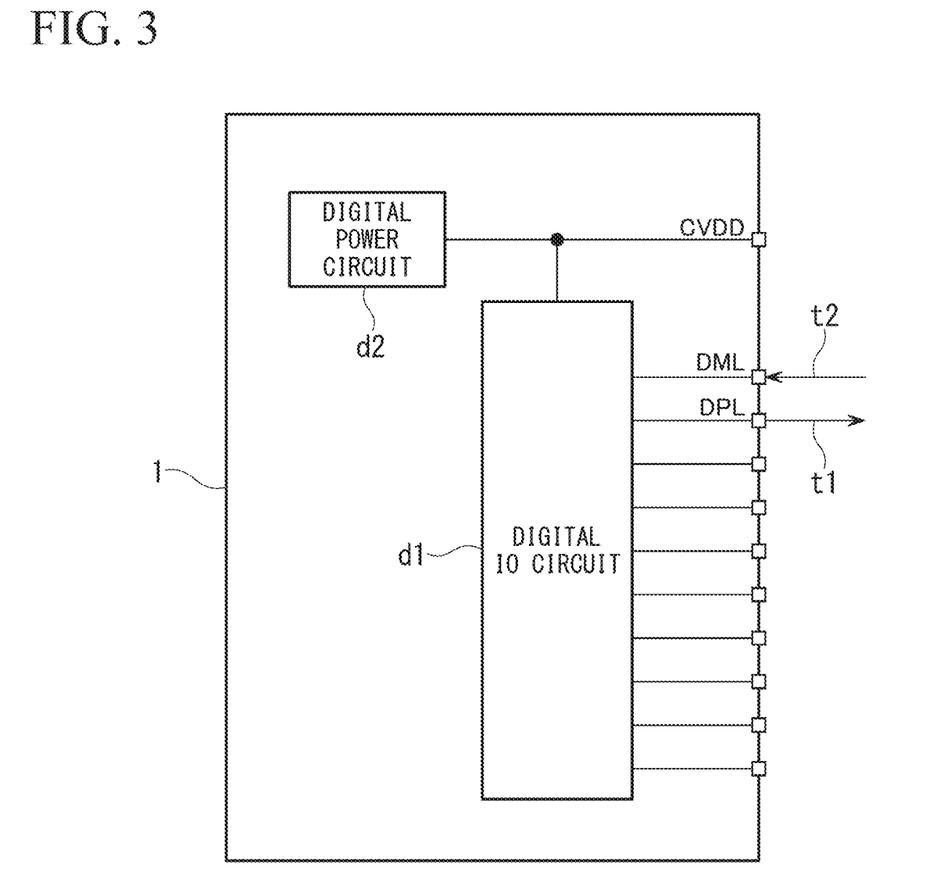
FIG. 3 is a circuit diagram showing the main functional configuration of the voltage detection circuit according to the embodiment of the invention.

As shown in FIG. 3 in addition to FIG. 2, the power monitor terminal CVDD is a monitor terminal which is connected to a digital input/output circuit (digital IO circuit) d1 connected to the first communication terminal DPL and the second communication terminal DML. The digital IO circuit d1 is a digital circuit that generates an uplink communication signal for communication with the outside through the communication cable T and shapes the waveform of a downlink communication signal.

The digital IO circuit d1 is a digital circuit that is operated by power (digital power) supplied from a digital power circuit d2 to generate an unlink communication signal and to shape the waveform of a downlink communication signal. The power monitor terminal CVDD is an output terminal that is connected to a power input end of the digital IO circuit d1, that is, an output end of the digital power circuit d2 and is used to monitor the voltage value of the digital power.

The plurality of CR filters 2 are low-pass filters each of which includes a resistor and a capacitor as shown in FIG. 2. In each CR filter 2, the resistor has one end that is connected to the electrode of each battery cell and the other end that is connected to a corresponding terminal of the terminals IN0 to IN16 and one end of the capacitor. Further, in each CR filter 2, the capacitor has one end that is connected to the other end of the resistor and the corresponding terminal of the terminals IN0 to IN16 and the other end that is grounded.

The CR filters 2 are low-pass filters that remove noise superimposed on the voltage input from each battery cell to the terminals IN0 to IN16. The in-vehicle battery control device A according to this embodiment and the assembled battery B to be controlled by the in-vehicle battery control device A are connected by predetermined electric wires (voltage detection lines), and noise may come into the voltage detection lines from the outside. Each CR filter 2 prevents the noise from coming into the terminals IN0 to IN16.

The communication addition circuit 3 is a characteristic component of the in-vehicle battery control device A according to this embodiment. The communication addition circuit 3 corresponds to a passive circuit and a second passive circuit according to the invention and includes a first resistor 4, a second resistor 5, a first capacitor 6, and a second capacitor 7 as shown in FIG. 2.

The first resistor 4 has a first resistance value Ra and has one end that is connected to the first communication terminal DPL and the other end that is connected to one end of the first capacitor 6 and one end of the second capacitor 7. The second resistor 5 has a second resistance value Rb and has one end that is connected to the second communication terminal DML and the other end that is connected to the one end of the first capacitor 6, the one end of the second capacitor 7, and the other end of the first resistor 4. In addition, the first resistance value Ra and the second resistance value Rb are set to, for example, the same value.

The first capacitor 6 has a first capacitance Ca and has one end that is connected to the other end of the first resistor 4, the other end of the second resistor 5, and the one end of the second capacitor 7 and the other end that is grounded. The second capacitor 7 has a second capacitance Cb and has one end that is connected to the other end of the first resistor 4, the other end of the second resistor 5, and the one end of the first capacitor 6 and the other end that is connected to the power monitor terminal CVDD. In addition, the first capacitance Ca and the second capacitance Cb are set to, for example, the same value.

Among the first resistor 4, the second resistor 5, the first capacitor 6, and the second capacitor 7, the first resistor 4, the second resistor 5, and the first capacitor 6 constitute the passive circuits according to the invention. That is, the first resistor 4, the second resistor 5, and the first capacitor 6 are the passive circuit that connects the first communication terminal DPL to GND (ground potential) through the first resistance value Ra and the first capacitance Ca and connects the second communication terminal DML to the GND (ground potential) through the second resistance value Rb and the first capacitance Ca.

Further, the second capacitor 7 is a passive circuit (passive element) that connects the first communication terminal DPL connected through the first resistance value Ra and the second communication terminal DML connected through the second resistance value Rb to the digital power supply through the second capacitance Cb. The second capacitor 7 and the first capacitor 6 constitute the second passive circuit according to the invention.

Next, the operation of the in-vehicle battery control device A according to this embodiment will be described in detail with reference to FIGS. 4A—FIG. 4C and FIGS. 5A-FIG. 5B.

In the in-vehicle battery control device A, when the control circuit S outputs a voltage transmission command requesting the transmission of the cell voltage to the second communication line t2, the voltage transmission command is received as the downlink communication signal by all of the voltage detection circuits D1 to Dn through the second communication line t2 of each communication cable T and the voltage detection circuits D1 to Dn.

As a result, all of the voltage detection circuits D1 to Dn output detection voltage signals obtained by adding the identification numbers of the voltage detection circuits D1 to Dn to the cell voltages of the corresponding battery modules M1 to Mn to the first communication lines t1. The control circuit S receives the detection voltage signals output by the voltage detection circuits D1 to Dn to the first communication lines t1 as the uplink communication signals through the first communication line t1 of each communication cable T and the voltage detection circuits D1 to Dn.

Here, the communication addition circuit 3 is provided in each of the voltage detection circuits D1 to Dn. The communication addition circuit 3 functions as follows when the voltage detection circuits D1 to Dn transmit the uplink communication signals and receive the downlink communication signals.

In the voltage detection IC 1 that generates the uplink communication signal, since the first communication terminal DPL that outputs the uplink communication signal is set in an alternating current manner through the first resistor 4 (first resistance value Ra) and the first capacitor 6 (first capacitance Ca), the first resistor 4 (first resistance value Ra) and the first capacitor 6 (first capacitance Ca) stabilize the potential of the uplink communication signal.

Further, in the voltage detection IC 1 that generates the downlink communication signal, since the second communication terminal DML that outputs the downlink communication signal is set in the alternating current manner through the second resistor 5 (second resistance value Rb) and the first capacitor 6 (first capacitance Ca), the second resistor 5 (second resistance value Rb) and the first capacitor 6 (first capacitance Ca) stabilize the potential of the downlink communication signal.

According to this embodiment, the first communication terminal DPL and the second communication terminal DML for the input and output of the communication signals are grounded in the alternating current manner by the passive circuit composed of the first resistor 4, the second resistor 5, and the first capacitor 6. Therefore, it is possible to ensure the stability of the potential of the communication signal.

Further, the communication addition circuit 3 is provided with the second capacitor 7 in addition to the passive circuit. That is, the power monitor terminal CVDD in the voltage detection IC 1, that is, the power (digital power) of the digital IO circuit d1 that finally inputs and outputs the communication signals in the voltage detection IC 1 is grounded in the alternating current manner by the second passive circuit composed of the second capacitor 7 and the first capacitor 6.

Figure 4A:
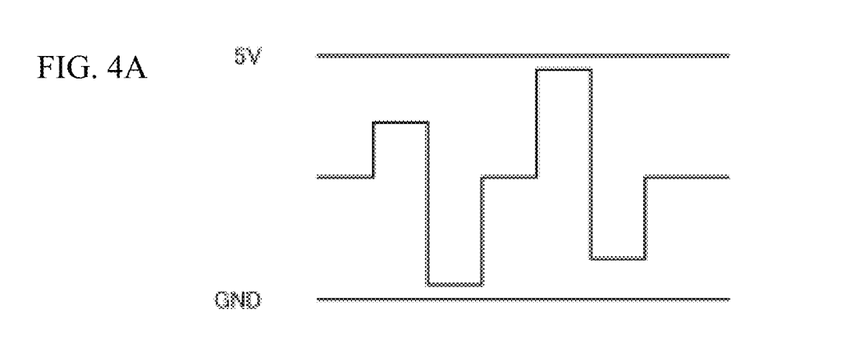
Figure 4B:
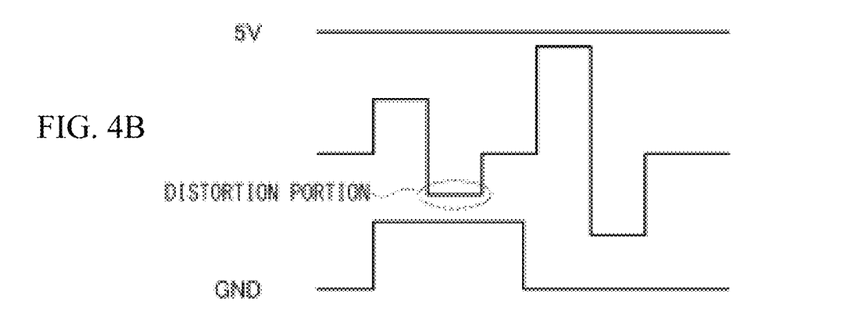
Figure 4C:
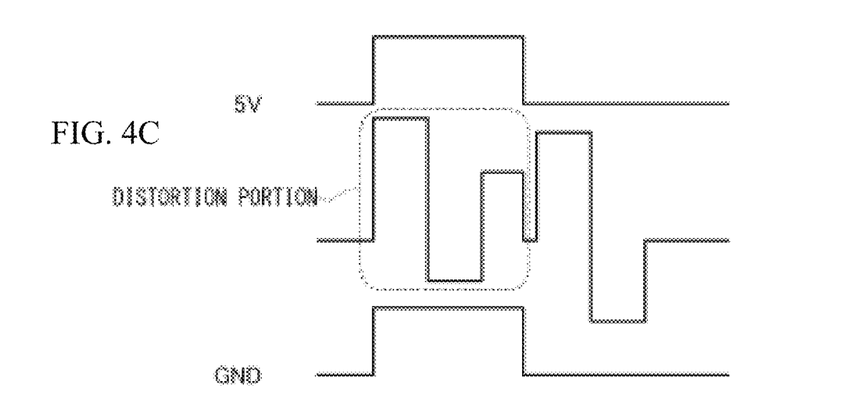

According to this embodiment, as shown in a portion FIG. 4A to a portion FIG. 4C, the waveform of the communication signal is different between a case in which pulsed noise is not superimposed on the GND (ground potential) (the portion FIG. 4A) and a case in which the pulsed noise is superimposed on the GND (ground potential) (a portion FIG. 4B). That is, when the noise is not superimposed, waveform distortion does not occur in the communication signal in the portion FIG. 4A. However, when the noise is superimposed on the GND, waveform distortion occurs in a portion of the communication signal as in the waveform of the communication signal shown in the portion FIG. 4B.

According to this embodiment, for the noise, it is possible to change the digital power in synchronization with the noise superimposed on the GND (ground potential). That is, according to this embodiment, when the GND (ground potential) and the digital power (5 V) are changed by noise in synchronization with each other, the waveform of the communication signal is also changed in synchronization with the noise superimposed on the GND (ground potential) as shown in the portion FIG. 4C. Therefore, it is possible to suppress the waveform distortion of the communication signal and thus to achieve stable communication.

The in-vehicle battery control device A according to this embodiment is provided with the plurality of CR filters 2. In the CR filters 2, as described above, the other end of the capacitor is connected to the GND (ground potential), and noise coming into the voltage detection line from the outside is bypassed to the GND (ground potential) through the capacitor. Therefore, pulsed noise tends to be easily superimposed on the GND (ground potential).

However, the control circuit S determines the state of each of the battery modules M1 to Mn or the assembled battery B on the basis of the cell voltages of the battery modules M1 to Mn received from the voltage detection circuits D1 to Dn and controls each of the battery modules M1 to Mn or the assembled battery B on the basis of the determination result.

For example, when one battery cell of the first battery module M1 is at an abnormal voltage, the control circuit S performs control such that a discharge circuit which is connected in parallel to the battery cell corresponding to the abnormal voltage among the battery cells of the first battery module M1 is set to an ON state from an OFF state to prevent a charging current from flowing into the battery cell corresponding to the abnormal voltage.

In addition, the invention is not limited to the above-described embodiment. For example, the following modification examples are considered.

(1) In the above-described embodiment, the case in which the communication cable T separately includes the first communication line t1 for uplink communication and the second communication line t2 for downlink communication has been described. However, the invention is not limited thereto. The invention can also be applied to a communication cable in which a single communication line transmits both a downlink communication signal and an uplink communication signal.

(2) In the above-described embodiment, the power monitor terminal CVDD is grounded in the alternating current manner by the first capacitor 6 and the second capacitor 7 constituting the second passive circuit. However, the invention is not limited thereto. The essential function of the second passive circuit is to change the power (digital power) of the digital IO circuit d1, which inputs and outputs the downlink communication signal and the uplink communication signal, in synchronization with the pulsed noise superimposed on the GND (ground potential). Therefore, any circuit portion other than the power monitor terminal CVDD may be used as long as it can change the power (digital power) of the digital IO circuit d1 in synchronization with the pulsed noise.

Figure 5A:
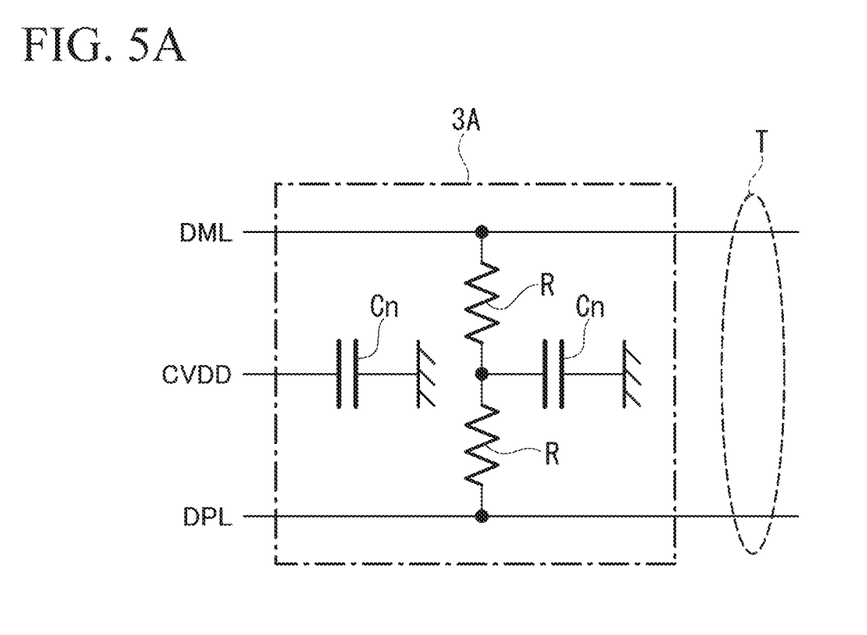
FIG. 5A is a circuit diagram showing a modification example of the voltage detection circuit according to the embodiment of the invention.
Figure 5B:
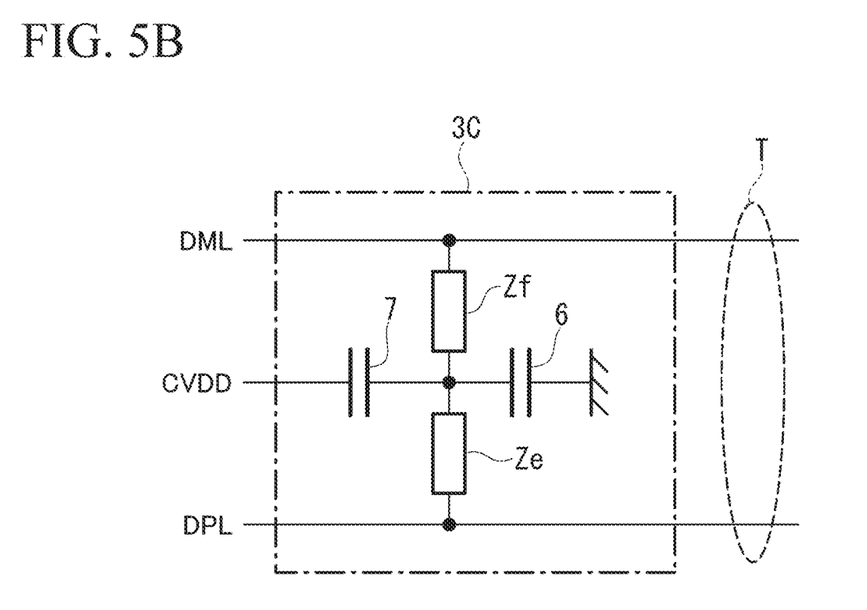
FIG. 5B is a circuit diagram showing a modification example of the voltage detection circuit according to the embodiment of the invention.

(3) The communication addition circuit 3 including the first resistor 4, the second resistor 5, the first capacitor 6, and the second capacitor 7 is adopted. However, the invention is not limited thereto. For example, as shown in FIG. 5A, a communication addition circuit 3A may be adopted instead of the communication addition circuit 3.

In the communication addition circuit 3A, one end of the second capacitor 7 is not connected to the other end of the first resistor 4, the other end of the second resistor 5, and one end of the first capacitor 6, but is connected to the GND (ground potential). According to the communication addition circuit 3A, it is possible to stabilize the potential of the communication signal and to reduce the influence of noise as in the communication addition circuit 3. In the communication addition circuit 3A, the second capacitor 7 corresponds to the second passive circuit according to the invention.

(4) In the above-described embodiment, the communication addition circuit 3 is adopted. However, a communication addition circuit 3C shown in FIG. 5B may be adopted instead of the communication addition circuit 3. In the communication addition circuit 3C, a third series circuit Ze replaces the first resistor 4, and a fourth series circuit Zf replaces the second resistor 5. Each of the third series circuit Ze and the fourth series circuit Zf is, for example, a series circuit of a resistor and a capacitor.

While preferred embodiments of the invention have been described and shown above, it should be understood that these are examples of the invention and are not to be considered as limiting. Additions, omissions, substitutions, and other modifications can be made without departing from the scope of the invention defined in the claims. Accordingly, the invention is not to be considered as being limited by the described description and is only limited by the scope of the appended claims.

What is claimed is:

1. A battery control device comprising:
    a plurality of voltage detection circuits that are provided so as to correspond to a plurality of battery modules constituting a battery and detect voltages of the battery modules;
    a plurality of communication cables that connect the voltage detection circuits in a daisy chain manner through coupling capacitors; and
    a control circuit that transmits and receives communication signals to and from the voltage detection circuits through the communication cables and controls the battery on the basis of the voltages received from the voltage detection circuits,
    wherein communication terminals connected to the communication cables in the voltage detection circuit are grounded through a predetermined passive circuit,
    the communication cable separately includes a first communication line for uplink communication and a second communication line for downlink communication, and
    each of a first communication terminal connected to the first communication line and a second communication terminal connected to the second communication line in the voltage detection circuit is grounded through the passive circuit,
    the passive circuit includes
    a first resistor that has one end connected to the first communication terminal;
    a second resistor that has one end connected to the second communication terminal; and
    a capacitor that has one end connected to the other end of the first resistor and the other end of the second resistor and the other end grounded, and
    a power terminal of the voltage detection circuit is connected to the other end of the first resistor through a second capacitor.

2. The battery control device according to claim 1,
    wherein a power terminal of the voltage detection circuit is grounded through a second passive circuit.

* * * * *